United States Patent
Li et al.

(10) Patent No.: US 8,055,741 B2
(45) Date of Patent: Nov. 8, 2011

(54) MODEM AND CONFIGURATION METHOD THEREOF

(75) Inventors: Jie Li, Shenzhen (CN); Kuo-Wei Hung, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 254 days.

(21) Appl. No.: 12/476,120

(22) Filed: Jun. 1, 2009

(65) Prior Publication Data
US 2010/0030903 A1 Feb. 4, 2010

(30) Foreign Application Priority Data
Jul. 31, 2008 (CN) .......................... 2008 1 0303292

(51) Int. Cl.
G06F 15/177 (2006.01)
G06F 15/173 (2006.01)
G06F 15/16 (2006.01)
(52) U.S. Cl. ........ 709/222; 709/220; 709/221; 709/223; 709/224; 709/228
(58) Field of Classification Search .................. 709/228, 709/220-224
See application file for complete search history.

(56) References Cited

U.S. PATENT DOCUMENTS

| | | | |
|---|---|---|---|
| 6,958,996 B2* | 10/2005 | Xiong | 370/389 |
| 7,164,762 B2* | 1/2007 | Hanson et al. | 379/212.01 |
| 7,835,355 B2* | 11/2010 | Miyata | 370/389 |
| 2003/0145332 A1* | 7/2003 | Furuta | 725/111 |
| 2003/0219011 A1* | 11/2003 | Han | 370/352 |
| 2005/0180408 A1* | 8/2005 | Mangetsu | 370/356 |
| 2007/0056538 A1* | 3/2007 | Simpson et al. | 123/90.17 |
| 2007/0076607 A1* | 4/2007 | Voit et al. | 370/230 |
| 2007/0111568 A1* | 5/2007 | Ferrari et al. | 439/131 |
| 2007/0211700 A1* | 9/2007 | Hsieh et al. | 370/356 |
| 2007/0291742 A1* | 12/2007 | Schenk et al. | 370/352 |
| 2008/0013463 A1* | 1/2008 | Greel et al. | 370/254 |
| 2008/0062876 A1* | 3/2008 | Giroux et al. | 370/235 |
| 2008/0159302 A1* | 7/2008 | Tu et al. | 370/401 |
| 2008/0225749 A1* | 9/2008 | Peng et al. | 370/254 |
| 2009/0013210 A1* | 1/2009 | McIntosh et al. | 714/4 |
| 2009/0201916 A1* | 8/2009 | Caron et al. | 370/352 |

FOREIGN PATENT DOCUMENTS

| CN | 101043513 A | 9/2007 |
|---|---|---|
| CN | 101155039 A | 4/2008 |

* cited by examiner

*Primary Examiner* — Hieu Hoang
(74) *Attorney, Agent, or Firm* — Altis Law Group, Inc.

(57) ABSTRACT

A modem includes a dynamic host configuration protocol (DHCP) module, a point-to-point protocol over Ethernet (PPPoE) module, and a network monitor module. The DHCP module automatically establishes a DHCP connection over a communication network, and generates a first notification signal after the DHCP connection is established. The PPPoE module automatically establishes a PPPoE connection over the communication network and automatically configures parameters of an Internet access service over the communication network and generates a second notification signal after the PPPoE connection is established. The network monitor module determines current network properties of the communication network upon receipt of the first notification signal and/or the second notification signal, and selectively configures parameters of the Internet access service and a voice over Internet protocol (VoIP) service.

10 Claims, 3 Drawing Sheets

MODEM AND CONFIGURATION METHOD THEREOF

BACKGROUND

1. Technical Field

The disclosure relates to communication devices, and particularly to a modem and configuration method thereof.

2. Description of Related Art

Terminal devices, such as computers and voice over Internet protocol (VoIP) phones, communicate with the Internet or other communication networks via modems, which are usually provided by service providers. However, different service providers provide different network properties and services. Network properties include pure dynamic host configuration protocol (DHCP) to provide VoIP services and Internet access services, pure point-to-point protocol over Ethernet (PPPoE) to provide VoIP services and Internet access services, and co-deployed DHCP and the PPPoE at the same time to provide VoIP services and Internet access services.

A modem must thus be preset with different network configurations before use. When network properties of a modem are changed, the modem needs to be reconfigured, presenting inconvenience to a user.

DETAILED DESCRIPTION

Figure 1:
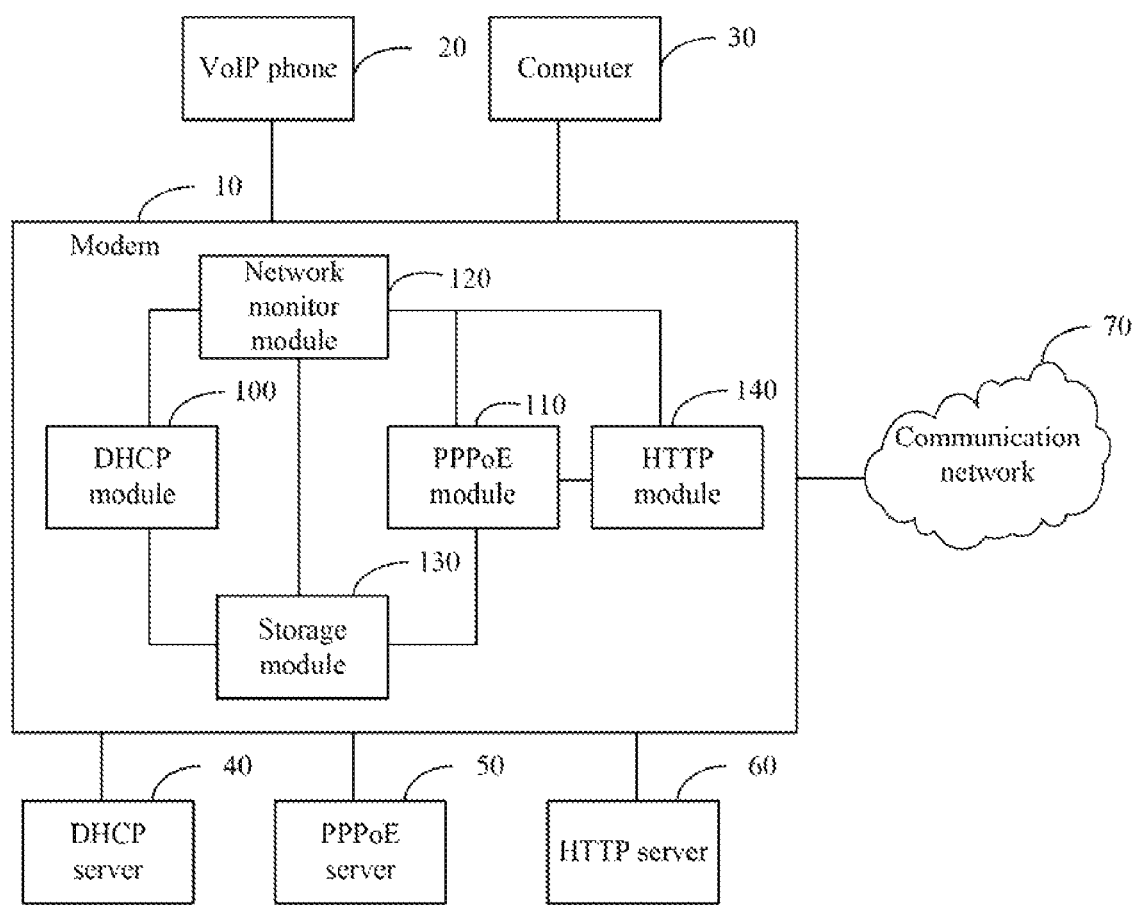
FIG. 1 is a schematic diagram of one embodiment of a modem as disclosed.

FIG. 1 is a schematic diagram of a modem 10 as disclosed. When powered on, the modem 10 automatically monitors properties of a communication network 70, and self configures to provide an Internet access service and a voice over Internet protocol (VoIP) services over the communication network 70 according to the current network properties. If both point-to-point protocol over Ethernet (PPPoE) and dynamic host configuration protocol (DHCP) are deployed in the communication network 70, the modem 10 provides the VoIP service to a VoIP phone 20 connected thereto via the DHCP, and provides the Internet access service to a computer 30 connected thereto via the PPPoE. The modem 10 includes a DHCP module 100, a PPPoE module 110, a network monitor module 120, a storage module 130, and a hypertext transfer protocol (HTTP) module 140.

The DHCP module 100 automatically establishes a DHCP connection with a DHCP server 40 over the communication network 70 when the modem 10 is powered on, and generates a first notification signal if the DHCP connection is established. In one embodiment, when the modem 10 is powered on, the DHCP module 100 is automatically triggered and attempts to establish the DHCP connection. The DHCP module 100 broadcasts a DHCP discovery packet in the communication network 70, and if there is a DHCP server 40 present, the DHCP server 40 receives the DHCP discovery packet and transmits a DHCP offer packet to the DHCP module 100. The DHCP module 100 transmits a DHCP request to the DHCP server 40, and the DHCP server 40 transmits a DHCP acknowledge (ACK) packet to the DHCP module 100 accordingly, and the DHCP connection is established. The DHCP ACK packet includes a plurality of options including an IP address and VoIP parameters allocated to the DHCP module 100.

The storage module stores the DHCP ACK packet received by the DHCP module 100.

The PPPoE module 110 automatically establishes a PPPoE connection with a PPPoE server 50 over the communication network 70 when the modem 10 is powered on, automatically configures parameters of a communication network (e.g. an Internet access service over the communication network 70) when the PPPoE connection is established, and generates a second notification signal. The parameters of the Internet access service include Internet protocol (IP) addresses. In one embodiment, when the modem 10 is powered on, the PPPoE module 110 is automatically triggered, and retrieves the Internet access service parameters, such as, IP addresses, from the PPPoE server 50 via a PPPoE discovery course and a PPPoE session course, and establishes the PPPoE connection with the PPPoE server 50 in the communication network 70. At this time, the modem 10 can provide Internet access service to the computer 30 via the PPPoE module 110.

The network monitor module 120 receives the first notification signal from the DHCP module 100 and/or the second notification signal from the PPPoE module 110, and determines the current network properties of the communication network 70 upon receipt of the first notification signal and/or the second notification signal. The network monitor module 120 further selectively configures parameters of the Internet access service and the VoIP service correspondingly to provide the Internet access service to the computer 30 and the VoIP service to the VoIP phone 20. In one embodiment, the network properties include the communication network 70 support for DHCP and/or PPPoE. If only the first notification signal is received from the DHCP module 100, the network monitor module 120 determines support for only DHCP. At this time, both the parameters of the Internet access service and the VoIP service are non-configured, so the network monitor module 120 retrieves and parses the DHCP ACK packet from the storage module 130 to retrieve the allocated IP addresses and VoIP parameters to configure the parameters of the Internet access service and the VoIP service. Thus, the modem 10 provides the Internet access service and the VoIP service via the DHCP.

If only the second notification signal is received from the PPPoE module 110, the network monitor module 120 determines support for only PPPoE, and triggers the HTTP module 140. At this time, the parameters of the Internet access service have been configured by the PPPoE module 110, and the parameters of the VoIP service are non-configured.

If the first notification signal is received from the DHCP module 100 and the second notification signal is received from the PPPoE module 110, the network monitor module 120 determines support for both DHCP and PPPoE. At this time, the parameters of the Internet access service have been configured by the PPPoE module 110, and the parameters of the VoIP service are non-configured, so the network monitor module 120 configures the modem 10 according to a preset rule. In one embodiment, the preset rule dictates that when the communication network 70 supports both the DHCP and the PPPoE, the modem 10 provides Internet access service to the computer 30 via the PPPoE and the VoIP service to the VoIP phone 20 via the DHCP. Therefore, the network monitor module 120 retrieves and parses the DHCP ACK packet from the storage module 130 to retrieve the allocated IP addresses and VoIP parameters to configure the parameters of the VoIP service. Thus, the modem 10 provides the VoIP service via the DHCP and the Internet access service via the configured parameters of the Internet access service by the PPPoE module 110.

The HTTP module 140 is triggered by the network monitor module 120 when the network monitor module 120 determines network support for only the PPPoE to retrieve VoIP parameters from an HTTP server 60. In one embodiment, the HTTP module 140 retrieves extensible markup language (XML) files including the VOIP parameters from the HTTP server 60. The HTTP module 140 further determines if the VoIP parameters are retrieved from the HTTP server 60, and retrieves the VoIP parameters from the HTTP server 60 until a retrieved count exceeds a predetermined count. In this disclosure, the predetermined count can be set according to needs of users, and may be 3.

The network monitor module 120 further parses the XML files received by the HTTP module 140 to retrieve the VoIP parameters therefrom, and configures the parameters of the VoIP service according to the retrieved VoIP parameters. Thus, the modem 10 provides the VoIP service via the PPPoE.

In one example, because speed of the DHCP module 100 retrieves IP addresses slower than the PPPoE module 110 retrieves IP addresses, after establishing the PPPoE connection, the PPPoE module 110 transmits the second notification signal to the network monitor module 120 after a preset time period. Thus, the network monitor module 120 avoids erroneous determination of network support for only the PPPoE and subsequent mis-configuration of the modem 10. The network monitor module 120 monitors network properties continuously, thus, if the DHCP module 100 retrieves the IP addresses after the preset time period, the network monitor module 120 can determine network properties and configure the modem 10 again.

In another example, the network monitor module 120 further stores network properties and current configured parameters of the Internet access service and the VoIP service for subsequent speedy configuration of the modem 10.

Figure 2:
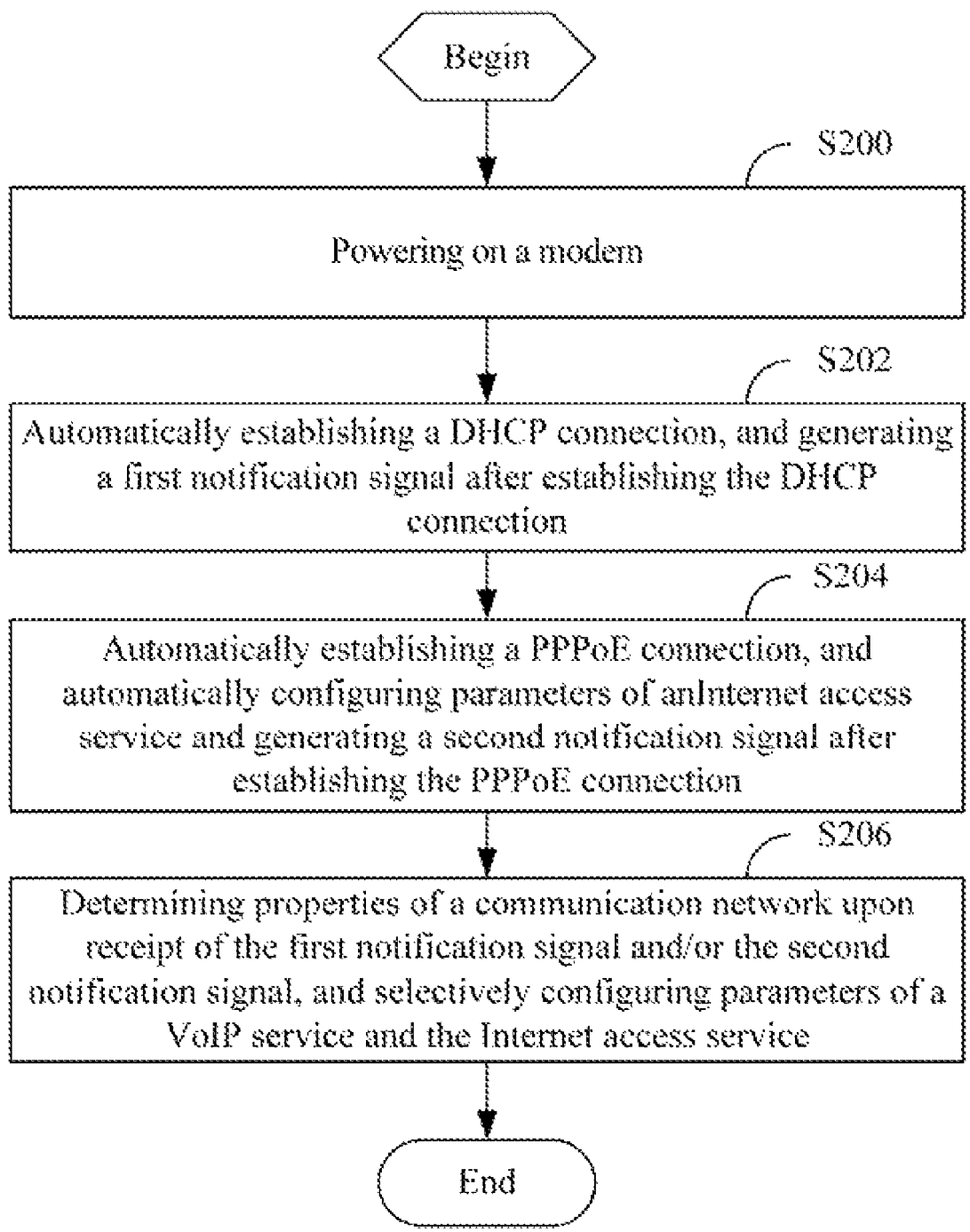
FIG. 2 is a flowchart of a first embodiment of a configuration method of a modem as disclosed.

FIG. 2 is a flowchart of a first embodiment of a configuration method of a modem 10 as disclosed. First, in block S200, the modem 10 is powered on. In block S202, the DHCP module 100 establishes a DHCP connection, and generates a first notification signal after establishing the DHCP connection. In block S204, the PPPoE module 110 establishes a PPPoE connection, and automatically configures parameters of the Internet access service and generates a second notification signal after establishing the PPPoE connection. In block S206, the network monitor module 120 determines properties of the communication network 70 upon receipt of the first notification signal from the DHCP module 100 and/or the second notification signal from the PPPoE module 110, and selectively configures parameters of a VoIP service and the Internet access service to provide the VoIP service to the VoIP phone 20 and the Internet access service to the computer 30.

Figure 3:
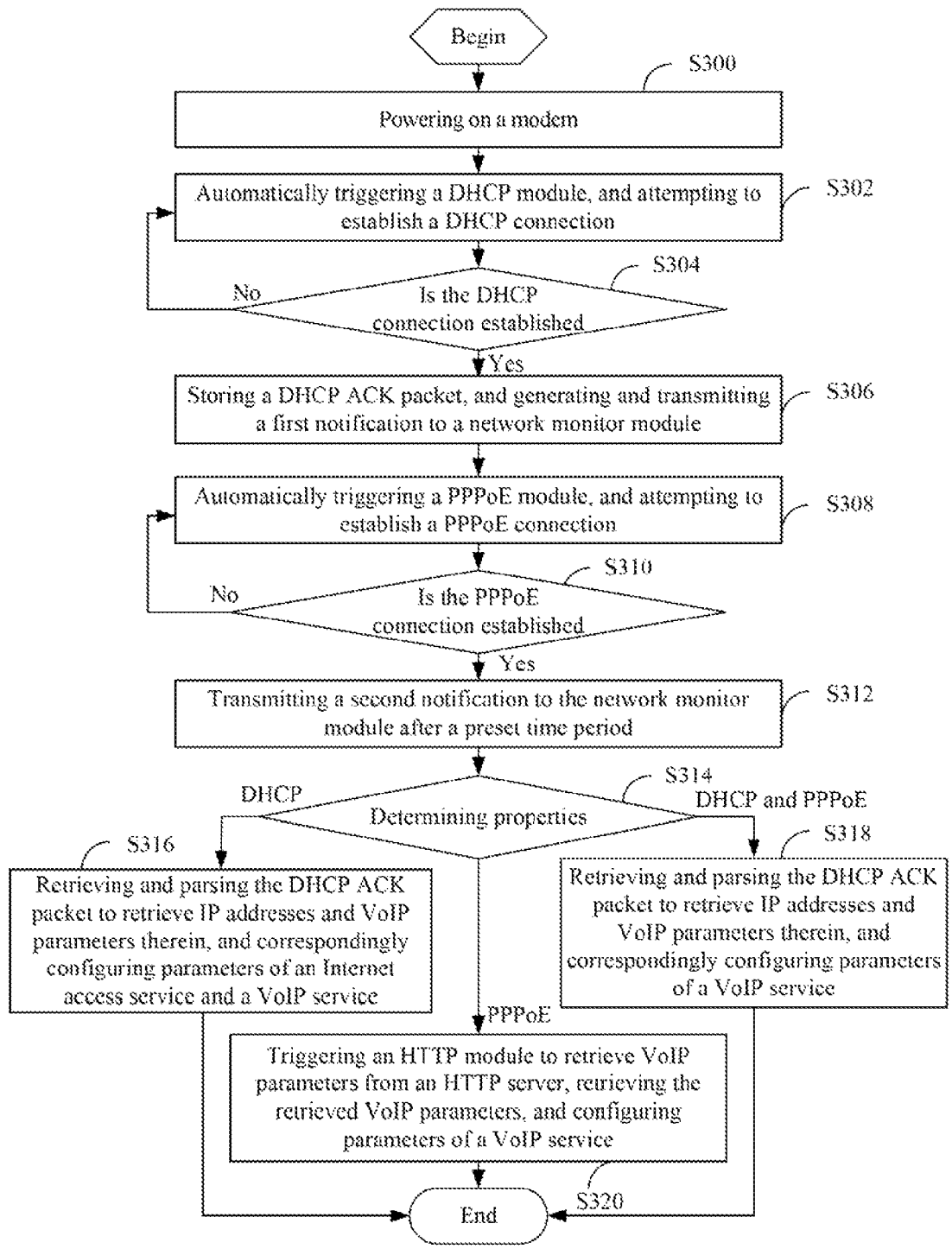
FIG. 3 is a flowchart of a second embodiment of a configuration method of a modem as disclosed.

FIG. 3 is a flowchart of a second embodiment of a configuration method of the modem 10 as disclosed. In block S300, the modem 10 is powered on. In block S302, the DHCP module 100 is automatically triggered, and attempts to establish a DHCP connection. The DHCP module 100 broadcasts a DHCP discovery packet in the communication network 70, if there is a DHCP server 40 present, the DHCP server 40 receives the DHCP discovery packet, and transmits a DHCP offer packet to the DHCP module 100. Then the DHCP module 100 transmits a DHCP request to the DHCP server 40, and the DHCP server 40 transmits a DHCP acknowledge (ACK) packet to the DHCP module 100 upon receiving the DHCP request. Thus, the DHCP module 100 establishes the DHCP connection.

In block S304, the DHCP module 100 determines if the DHCP connection is established upon receipt of a DHCP ACK packet from the DHCP server 40. If a DHCP ACK packet is received, the DHCP module 100 determines the DHCP connection is established, then in block S306, the DHCP module 100 stores the DHCP ACK packet to the storage module 130, and generates and transmits a first notification signal to the network monitor module 120. If no DHCP ACK packet is received, the DHCP module 100 determines no DHCP connection is established, and block S302 is repeated.

In block S308, the PPPoE module 110 is automatically triggered, and establishment of a PPPoE connection is attempted. The PPPoE module 110 retrieves IP addresses from the PPPoE server 50 via a PPPoE discovery course and a PPPoE session course, and establishes the PPPoE connection with the PPPoE server 50. In block S310, the PPPoE module 110 determines if the PPPoE connection is established. If the PPPoE connection is not established, block S308 is repeated.

If the PPPoE connection is established, in block S312, the PPPoE module 110 automatically configures parameters of an Internet access service, and transmits a second notification signal to the network monitor module 120 after a preset time period. In block S314, the network monitor module 120 determines properties of the communication network 70 upon receipt of the first notification signal and/or the second notification signal. In one embodiment, possible network properties include support for DHCP and/or PPPoE. If the network monitor module 120 determines support for only the DHCP, in block S316, the network monitor module 120 retrieves and parses the DHCP ACK packet from the storage module 130 to retrieve IP addresses and VoIP parameters therein, and correspondingly configures parameters of an Internet access service and a VoIP service to provide the Internet access service and the VoIP service via the DHCP.

If the network monitor module 120 determines support for both the DHCP and the PPPoE, in block S318, the network monitor module 120 retrieves and parses the DHCP ACK packet from the storage module 130 to retrieve the IP addresses and the VoIP parameters therein, and correspondingly configures parameters of the VoIP service to provide the VoIP service via the DHCP. The parameters of the Internet access service have been configured by the PPPoE module 110, and the Internet access service is provided via the PPPoE.

If the network monitor module 120 determines support for only the PPPoE, in block S320, the network monitor module 120 triggers the HTTP module 140 to retrieve VoIP parameters from the HTTP server 60, retrieves the retrieved VoIP parameters, and configures parameters of a VoIP service to provide the Internet access service and the VoIP service via the PPPoE. In one embodiment, the HTTP module 140 retrieves extensible markup language (XML) files including the VoIP parameters from the HTTP server 60. The HTTP module 140 further determines if the VoIP parameters are retrieved from the HTTP server 60, and retrieves the VoIP parameters from the HTTP server 60 until a retrieved count exceeds a predetermined count. In this disclosure, the predetermined count can be set according to needs of users, and may be 3.

In one embodiment, the blocks S302, S308, and S314 are performed at the same time after the modem 10 is powered on.

The modem 10 and the configuration method thereof automatically monitor network properties, and automatically configure the modem 10 accordingly. Thus, the modem 10 has good network compatibility, and decreases or eliminates manual configuration of the modem 10, increasing convenience.

The storage module 130 is any non-transitory data storage device that can store data which can be thereafter read by a computer system. Examples of the non-transitory data storage device include read-only memory (ROM), random-access memory (RAM), CD-ROMs, magnetic tapes, floppy disks, and optical data storage devices.

The foregoing disclosure of various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A modem, comprising:
    a dynamic host configuration protocol (DHCP) module for automatically establishing a DHCP connection with a DHCP server over a communication network when the modem is powered on, and generating a first notification signal when the DHCP connection is established, wherein the DHCP connection is established after the DHCP module receives a DHCP acknowledge (ACK) packet from the DHCP server over the communication network, wherein the DHCP ACK packet comprising Internet protocol (IP) addresses and voice over Internet protocol (VoIP) parameters allocated to the DHCP module;
    a storage module comprising a memory, the storage module for storing the DHCP ACK packet;
    a point-to-point protocol over Ethernet (PPPoE) module for automatically establishing a PPPoE connection with a PPPoE server over the communication network when the modem is powered on, automatically receiving Internet access service parameters from the PPPoE server, automatically configuring modem Internet access service parameters of an Internet access service over the communication network to provide the Internet access service via PPPoE according to the received Internet access service parameters and generating a second notification signal when the PPPoE connection is established; and
    a network monitor module for determining communication network support properties for DHCP and/or PPPoE of the communication network upon receipt of the first notification signal and/or the second notification signal, and selectively configuring modem VoIP parameters of a VoIP service over the communication network and the modem Internet access service parameters based on the determined communication network support properties;
    wherein if the network monitor module determines that the communication network supports both DHCP and PPPoE upon receiving both the first notification signal from the DHCP module and the second notification signal from the PPPoE module, the network monitor module retrieves and parses the DHCP ACK packet from the storage module to retrieve the allocated IP addresses and VoIP parameters from the DHCP ACK packet, and configures the modem VoIP service parameters according to the allocated IP addresses and VoIP parameters to provide the VoIP service via DHCP.

2. The modem of claim 1, wherein if the network monitor module determines that the communication network supports only DHCP upon receiving only the first notification signal from the DHCP module, the network monitor module retrieves and parses the DHCP ACK packet from the storage module to retrieve the allocated IP addresses and VoIP parameters from the DHCP ACK packet, and configures both the modem Internet access service parameters and the modem VoIP service parameters based on the allocated IP addresses and VoIP parameters.

3. The modem of claim 1, wherein the PPPoE module transmits the second notification signal to the network monitor module after a preset time period beginning when the PPPoE connection is established.

4. The modem of claim 1, further comprising a hypertext transfer protocol (HTTP) module triggered by the network monitor module, if the network monitor module determines that the communication network supports only PPPoE upon receiving only the second notification signal from the PPPoE module, to retrieve the VoIP parameters from a HTTP server.

5. The modem of claim 4, wherein the network monitor module-further configures the modem VoIP service parameters according to the retrieved VoIP parameters.

6. The modem of claim 1, wherein the network monitor module further stores the communication network support properties, the configured modem Internet access service parameters, and the configured modem VoIP service parameters.

7. A method for configuring a modem comprising:
    automatically establishing a dynamic host configuration protocol (DHCP) connection with a DHCP server over a communication network by a DHCP module of the modem when the modem is powered on, determining if the DHCP connection is established according to receiving a DHCP acknowledge (ACK) packet from the DHCP server, and generating a first notification signal when the DHCP connection is established;
    storing the DHCP ACK packet comprising Internet protocol (IP) addresses and voice over Internet protocol (VoIP) parameters allocated to the DHCP module to a storage module of the modem;
    automatically establishing a point-to-point protocol over Ethernet (PPPoE) connection with a PPPoE server over the communication network by a PPPoE module of the modem when the modem is powered on, automatically receiving Internet access service parameters from the PPPoE server, automatically configuring modem Internet access service parameters of an Internet access service over the communication network when the PPPoE connection is established to provide the Internet access service via PPPoE, and generating a second notification signal when the PPPoE connection is established;
    determining communication network support properties of the communication network for DHCP and/or PPPoE upon receiving the first notification signal and/or the second notification signal by a network monitor module of the modem, and selectively configuring modem VoIP parameters of a VoIP service and the modem Internet access service parameters based on the determined communication network support properties;
    retrieving and parsing the DHCP ACK packet from the storage module to retrieve the allocated IP addresses and VoIP parameters from the DHCP ACK packet and configuring the modem VoIP service parameters according to the allocated IP addresses and VoIP parameters to provide the VoIP service via DHCP if the communication network support properties indicate that the communication network supports both DHCP and PPPoE upon the network monitor module receiving both the first notification signal from the DHCP module and the second notification signal from the PPPoE module.

8. The method of claim 7, wherein the step of generating the second notification signal further comprises transmitting the second notification signal to the network monitor module after a preset time period beginning when the PPPoE connection is established.

9. The method of claim 7, further comprising: retrieving and parsing the DHCP ACK packet from the storage module to retrieve the allocated IP addresses and VoIP parameters from the DHCP ACK packet and configuring the modem VoIP service parameters and the modem Internet access service parameters according to the allocated IP addresses and VoIP parameters to provide both the VoIP service and the Internet access service via DHCP if the communication network support properties indicate that the communication network supports only DHCP upon the network monitor module receiving only the first notification signal from the DHCP module.

10. The method of claim 7, further comprising:
triggering a hypertext transfer protocol (HTTP) module of the modem to retrieve the VoIP parameters from a HTTP server if the communication network support properties indicate that the communication network supports only PPPoE upon the network monitor module receiving only the second notification signal from the PPPoE module, and retrieving the VoIP parameters from the HTTP server; and
configuring the modem VoIP service parameters according to the retrieved VoIP parameters.

* * * * *